(No Model.)
H. C. AUSTIN.
SEED PLANTER.
No. 260,923. Patented July 11, 1882.
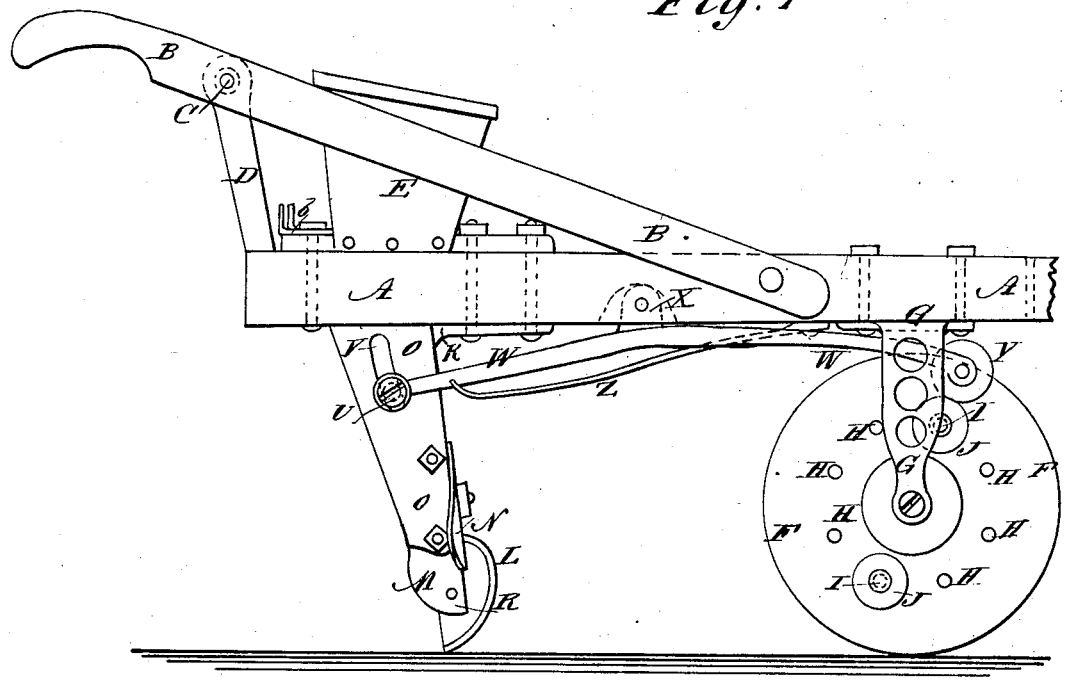
Fig. 1
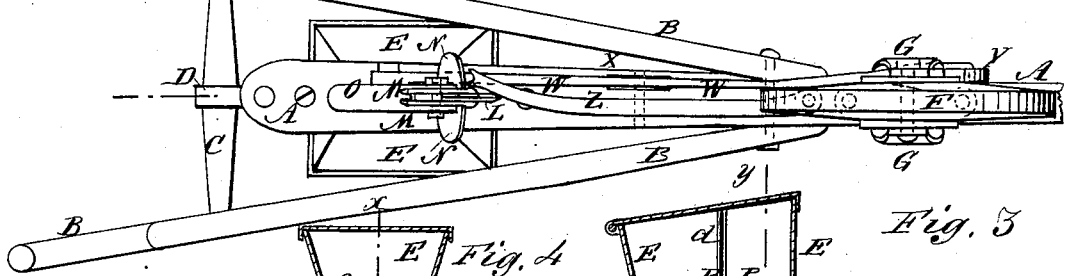
Fig. 2
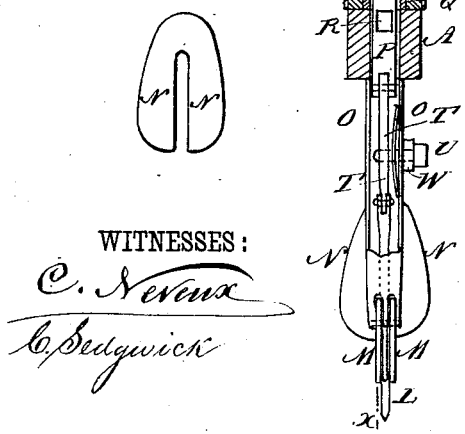
WITNESSES:
C. Neveux
C. Sedgwick
INVENTOR:
H. C. Austin
BY Munn & Co
ATTORNEYS.

UNITED STATES PATENT OFFICE.

HENRY C. AUSTIN, OF LOUISA, KENTUCKY, ASSIGNOR TO HIMSELF AND WILLIAM H. MOORE, OF SAME PLACE.

SEED-PLANTER.

SPECIFICATION forming part of Letters Patent No. 260,923, dated July 11, 1882.

Application filed September 19, 1881. (No model.)

*To all whom it may concern:*

Be it known that I, HENRY C. AUSTIN, of Louisa, in the county of Lawrence and State of Kentucky, have invented certain new and useful Improvements in Seed-Planters, of which the following is a specification.

Reference is to be had to the accompanying drawings, forming part of this specification, in which similar letters of reference indicate corresponding parts in all the figures.

Figure 1 is a side elevation of my improvement. Fig. 2 is an under side view of the same. Fig. 3 is a sectional side elevation of the rear part of the same, taken through the line $x\,x$ of Fig. 4. Fig. 4 is a sectional rear elevation taken through the line $y\,y$ of Fig. 3. Fig. 5 is an elevation of the gage-plate.

The object of this invention is to provide seed-planters constructed in such a manner that they will operate reliably upon smooth ground and upon rough and uneven ground.

The invention consists in the combination, with the beam, the seed-hopper, the slotted conductor-spout, and the drive-wheel having side pins, of vertical seed-dropping slides, a sliding bar connected with the said slides, a lever connected with the said bar and operated by the side pins of the drive-wheel, and the spring for bringing the lever back to its place, whereby the seed will be removed from the hopper in uniform quantities and dropped to the ground at equal distances apart; also, in the combination, with the hopper, the seed-spout, and the operating mechanism, of the vertically-reciprocating seed-slides provided with seed-cups in their sides, and the slotted plates placed in the said cups; also, in the combination, with the seed-spout provided with a slot, the seed-slides, and the drive-wheel provided with pins, of the forked bar, the lever, and the pin; also, in the combination, with the slotted seed-spout, the seed-slides, and the drive-wheel provided with pins, of the forked bar, the lever, the pin, and the bar for keeping the discharge-opening of the said spout clear, hinged to the lower end of the said forked bar; and, also, in the combination, with the hopper and the seed-slides provided with seed-cups, of the rods and the cut-off plates attached to the inner ends of the said rods, as will be hereinafter fully described.

A represents the beam of the planter, to the opposite sides of the middle part of which are attached the forward ends of the handles B. The rear parts of the handles B are connected by a round, C, to the center of which is attached the upper end of an upright, D. The lower end of the upright D is attached to the rear end of the beam A.

Upon the rear part of the beam A is placed the hopper E, the bottom of which projects in front and rear to receive the bolts by which the said hopper is secured to the said beam.

The forward part of the planter is supported by a wheel, F, which is journaled to a forked hanger, G, attached to the under side of the beam A. In the wheel F is formed a circle of holes, H, equally distant from the center of the said wheel to receive one or more pins I, which can be provided with small wheels or rollers J to lessen the friction. The pins I are intended to operate the seed-dropping mechanism hereinafter described, and the seed will be dropped at a less or greater distance apart, according as more or fewer pins I are used.

K is the standard, the upper part of which is bent forward and is bolted to the lower side of the beam at A. The lower part of the standard K is forked or slotted to receive the blade L, by which a channel is opened in the soil to receive the seed, and which is secured to the said standard detachably by bolts. Upon the rear side of the lower ends of the parts of the standard K are formed rearwardly-projecting jaws or wings M, to form a channel along the rear edge of the blade L, to guide the seed into the bottom of the channel formed by the said blade L and prevent the said channel from being filled with soil before the seeds have been deposited in it. The forward edge of the blade L is curved and made sharp, as shown in Figs. 1 and 3, to cause it to pass easily through the ground, however hard the said ground may be, to cause it to cut vines and roots that it may encounter, and to allow it to rise and pass over obstructions it cannot cut.

To the forward side of the lower part of the standard K is bolted a plate, N, which is slotted from its lower end to receive the blade L and the fastening-bolt, so that the said plate can be raised and lowered as may be required. The plate N is designed to push back loose soil, clods, stones, and other rubbish to prevent them from resting above the seed, and thus interfere with the coming up of the young plants, and to leave the top of the row smooth and level. The plate N also serves as a gage to insure the covering of the seed to a uniform depth.

O is a spout to receive the seed from the seed-dropping slides P and conduct it to the channel between the jaws or wings M. The spout O is made of sheet metal or other suitable material, bent to form a tapering spout, and attached at its side edges to the sides of the standard K, and extends from the beam A nearly to the ground. The seed-dropping slides P pass up through a slot in the beam A, and through apertures in the bottom of the hopper E and in the metal plate Q, let into and secured to the upper side of the said hopper-bottom, so that its upper surface will be flush with the upper surface of the said hopper-bottom. The plate Q is designed to prevent the hopper-bottom from being worn and the discharge-apertures enlarged by the friction of the slides P. In the outer sides or faces of the slides P are formed cups or recesses R to receive seed from the hooper E and convey it to the conductor-spout O, which cups R are made of such a size as to contain enough seed for a hill. The size of the seed-dropping cups R can be regulated to contain more or less seed by blocks or plates S placed in them, and slotted to receive the fastening-screws, so that they can be readily adjusted as may be required. The lower ends of the seed-dropping slides P are pivoted to the forked upper end of a short bar, T, placed in the upper part of the conductor-spout O, and kept in place by a pin, U, attached to it, and the ends of which pass through curved guide-slots V in the sides of the said conductor-spout O.

To one end of the pin U is pivoted the end of a lever, W, which passes along the under side of the beam A, and has a lug, X, formed upon the upper side of its middle part, to enter a mortise in the lower side of the said beam A and receive a pivoting pin or bolt passing through the said beam. The forward end of the lever W passes through the upper part of the slot in the hanger G, and projects into such a position as to be struck by the pin or pins I or their rollers J as the wheel F revolves. If desired, a small wheel or roller, Y, can be pivoted to the end of the lever W, to lessen the friction when the said lever comes in contact with the pins I or rollers J. With this construction, as the machine is drawn forward the rotation of the wheel F operates the lever W to draw down the slides P and convey seed from the hopper E to the spout O. As the forward end of the lever W is released the rear end of the said lever is raised to force the slides P upward to again receive seed by the action of the spring Z, the forward end of which is attached to the forward part of the lower side of the beam A, and its rear end rests against the rear part of the under side of the said lever W.

To the lower end of the bar T is pivoted the upper end of a rod, a, which passes down through the spout O, and is made of such a length that its lower end, at each downward movement of the bar T and slides P, will pass through the discharge-opening of the said spout O, and thus keep the said discharge-opening clear.

b are rods which pass in through the rear side of the hopper E, and have plates C attached to their inner ends in such positions that the said plates, by turning the said rods, will cover the seed-receiving cups R in the faces of the said dropping-slides P, so that the discharge of seed can be prevented when turning the machine and taking it from place to place.

I have described the machine as being made with two seed-dropping slides P; but it can be made with only one slide, if desired. When two slides P are used the hopper E can be divided into two compartments by a partition, d, the side edges of which enter grooves in the sides of the said hopper, so that the said partition can be readily removed.

Having thus fully described my invention, I claim as new and desire to secure by Letters Patent—

1. In a seed-planter, the combination, with the beam A, the hopper E, the slotted conductor-spout O, and the wheel F, having pins I, of the seed-dropping slides P, the sliding bar T, the pivoted lever W, and the spring Z, substantially as herein shown and described, whereby the seed will be removed from the hopper in uniform quantities and dropped to the ground at equal distances apart, as set forth.

2. In a seed-planter, the combination, with the hopper E, the seed-spout O, and the operating mechanism, of the vertically-reciprocating seed-slides, provided with seed-cups R in their sides, and the slotted plates S, placed in the said cups, substantially as and for the purpose set forth.

3. In a seed-planter, the combination, with the spout O, provided with slot V, the seed-slides P, and the drive-wheel F, provided with pins I, of the forked bar T, the lever W, and the pin U, substantially as and for the purpose set forth.

4. In a seed-planter, the combination, with the slotted spout O, the seed-slides P, and the drive-wheel F, provided with pins Q, of the forked bar T, the lever W, the pin U, and the bar a, hinged to the lower end of the said forked bar, substantially as and for the purpose set forth.

5. In a seed-planter, the combination, with the hopper E and the seed-slides P, provided with seed-cups R, of the rods b and the plates C, attached to the inner ends of the said rods, substantially as shown and described, whereby the cups of the seed-slides are adapted to be closed by turning the said rods, as set forth.

HENRY CALVIN AUSTIN.

Witnesses:
A. J. GARRED,
G. W. CASTLE.